Patented July 20, 1937

2,087,473

UNITED STATES PATENT OFFICE 2,087,473

SOLVENT REFINING OIL

Francis X. Govers, Vincennes, Ind., assignor to The Indian Refining Company, Lawrenceville, Ill., a corporation of Maine No Drawing. Application September 3, 1936, Serial No. 99,242

5 Claims. (Cl. 196—13)

This invention relates to refining hydrocarbon oil, and more particularly to refining mineral oil, such as a mineral lubricating oil, by solvent extraction.

The invention contemplates the treatment and refining of mineral oil with a solvent liquid comprising an alkyl ester of levulinic acid. The invention contemplates extracting the oil with methyl, ethyl, propyl, butyl or amyl levulinate.

More specifically, my invention comprises treating lubricating oil stock with one of the foregoing compounds, or a mixture thereof, so as to separate the oil into fractions respectively rich in low viscosity index and high viscosity index constituents, or, in other words, to separate the oil into fractions respectively rich in so-called naphthenic and so-called paraffinic constituents.

In the application of my invention to the treatment of a mineral lubricating oil fraction, such as obtained from Mid-Continent crude, for example, the oil is mixed with the solvent liquid in the proportion of about one part of oil to from one to two or more parts of solvent liquid. This mixture, after thorough agitation and at a suitable temperature, as, for example, around 125° F., upon standing, separates into two layers, one of which comprises an extract phase, while the other comprises a raffinate phase. The extract phase comprises the naphthenic constituents of relatively low viscosity index dissolved in the major portion of the solvent liquid, while the raffinate phase comprises the paraffinic constituents of relatively high viscosity index mixed with some of the solvent liquid.

These two phases are separated from each other and the solvent liquid recovered therefrom, either by distillation or by washing with some other suitable solvent liquid.

The temperature at which the separation is made and the ratio of solvent to oil used may be varied, depending upon the particular degree of extraction desired. Consequently, in some instances, and depending upon the nature of the oil undergoing treatment, it may be desirable to employ temperatures somewhat below or somewhat higher than that mentioned above. Likewise, the ratio of solvent to oil may be either greater or less than that specified.

By way of specific example, an untreated dewaxed distillate oil, prepared from Mid-Continent crude, and having the tests indicated below, was extracted with ethyl levulinate in order to effect separation between the low and high viscosity index constituents.

One part of oil was mixed with one part of ethyl levulinate at a temperature of 125° F. At this temperature, the mixture of oil and solvent was allowed to separate into extract and raffinate phases. The extract phase was removed, and the remaining raffinate phase was mixed with a fresh batch of the solvent in the proportion of one part of solvent to one part of oil at the same temperature. After thorough mixing, the mixture was again separated into extract and raffinate phases.

The latter two phases were then separated and the solvent liquid removed therefrom by distillation. After removal of the solvent from the final raffinate phase, the refined oil was found to have the following tests, as compared with the oil before extraction:

| | Oil before extraction | Raffinate oil |
|---|---|---|
| Gravity ° A. P. I. | | 25.1 |
| Saybolt univ. vis.@100° F | 1235 | 844 |
| Saybolt univ. vis.@210° F | 80.5 | 72 |
| Color tag. Robinson | ½ | 1 |
| Pour °F | −10 | −10 |
| Sulphur percent | 0.51 | 0.43 |
| Carbon residue percent | .69 | .36 |
| Sligh oxidation number | 82.1 | 31.9 |
| Viscosity index | 51 | 68 |

As shown in the foregoing tabulation, the raffinate oil has a viscosity index of 68, as compared with 51 in the case of the oil before extraction. It will also be observed that the raffinate oil was of improved color and contained a lower percentage of residual carbon and sulphur. This raffinate oil amounted to about 75% of the original charge.

While the batch type of extraction has been described in the foregoing example, it is contemplated that a continuous countercurrent or a stage countercurrent type of extraction may also be employed.

In some instances, it may be of advantage to carry out the extraction in the presence of a modifying solvent liquid, such as benzol, or a light petroleum fraction, such as propane or butane, for the purpose of facilitating extraction and further controlling the extent thereof.

The invention may be applied to the treatment of wax-bearing oil, and in which case it is contemplated using the extraction solvent in the dewaxing step by employing, in conjunction with the extraction solvent, a suitable modifying solvent as, for example, benzol or toluol. In such operation, the ester compound of my invention serves as the wax anti-solvent liquid component of the dewaxing solvent mixture.

The dewaxing step may either precede or follow the above described extracting step. For example, where it is desired to dewax first, one part of the wax-bearing oil may be mixed with three or four parts of a solvent mixture consisting of about 40% of the ester and 60% of the modifying solvent. The mixture is chilled to precipitate the wax constituents, and these wax constituents are removed from the cold mixture by mechanical means, such as filtration. Thereafter, the dewaxed solution is modified, either by stripping out all or part of the benzol, or by adding an additional quantity of the ester. If desired, the solution may be modified by a combination of these two methods. In any case, the solution is so modified that it exerts selective action as between the naphthenic and paraffinic constituents of the dewaxed oil, and separation into extract and raffinate phases takes place upon standing.

On the other hand, where it is desired to extract prior to dewaxing, the wax-bearing oil may be mixed with the ester compound, as already described, and after removal of the extract phase, the resulting raffinate phase containing some of the solvent, is then mixed with a suitable quantity of modifying solvent, such as benzol or toluol, together with an additional quantity of the ester compound, if necessary, the proportions used being sufficient to exert selective action as between wax and oil at temperatures of around 0° F. The mixture of oil and solvent is then chilled to precipitate the wax, and the wax removed from the chilled mixture in the usual manner.

Obviously, many modifications and variations of the invention, as hereinbefore set forth, may be made without departing from the spirit and scope thereof, and therefore only such limitations should be imposed as are indicated in the appended claims.

I claim:

1. In the refining of mineral oil containing relatively low and relatively high viscosity index constituents to separate therefrom a relatively high viscosity index fraction, the method which comprises mixing the oil with a solvent selected from the group consisting of methyl, ethyl, propyl, butyl and amyl levulinate, forming an extract phase containing relatively low viscosity index constituents of the oil dissolved in the solvent liquid and a raffinate phase comprising the relatively high viscosity index constituents of the oil, separating the two phases, and removing the solvent liquid therefrom.

2. In the refining of mineral lubricating oil containing relatively low and relatively high viscosity index constituents to separate therefrom a relatively high viscosity index fraction, the method which comprises mixing the oil with a solvent selected form the group consisting of methyl, ethyl, propyl, butyl and amyl levulinate, forming an extract phase containing relatively low viscosity index constituents of the oil dissolved in the solvent liquid and a raffinate phase comprising the relatively high viscosity index constituents of the oil, separating the two phases, and removing the solvent liquid therefrom.

3. In the method of solvent refining wax-bearing mineral oil containing low and high viscosity index constituents wherein the low viscosity index constituents are removed from the oil by extraction with a selective solvent selected from the group consisting of methyl, ethyl, propyl, butyl and amyl levulinate, the step, in combination with extraction of the oil, which comprises dewaxing the oil with said selective solvent in the presence of a modifying solvent.

4. The method of dewaxing wax-bearing mineral oil which comprises mixing the oil with a solvent liquid comprising a mixture of a solvent selected from the group consisting of methyl, ethyl, propyl, butyl and amyl levulinate, and a modifying solvent in proportion such that the mixture has selective action as between oil and wax at temperatures of around 0° F., chilling the mixture to precipitate the wax constituents, and removing the wax constituents so precipitated.

5. The method of refining mineral lubricating oil containing low and high viscosity index constituents to separate therefrom a relatively high viscosity index fraction which comprises mixing the oil with a solvent comprising ethyl levulinate, forming an extract phase containing low viscosity index constituents dissolved in the bulk of the solvent and a raffinate phase comprising high viscosity index constituents, mixed with some of the solvent, separating the two phases, and removing the solvent therefrom.

FRANCIS X. GOVERS.